(12) United States Patent
Kawasaki

(10) Patent No.: US 8,235,320 B2
(45) Date of Patent: Aug. 7, 2012

(54) DUAL-BEARING REEL

(75) Inventor: Ken'ichi Kawasaki, Sakai (JP)

(73) Assignee: Shimano Inc., Osaka (JP)

( * ) Notice: Subject to any disclaimer, the term of this patent is extended or adjusted under 35 U.S.C. 154(b) by 316 days.

(21) Appl. No.: 12/618,790

(22) Filed: Nov. 16, 2009

(65) Prior Publication Data

US 2011/0057063 A1    Mar. 10, 2011

(30) Foreign Application Priority Data

Dec. 16, 2008  (JP) ................................ 2008-319832

(51) Int. Cl.
*A01K 89/01* (2006.01)
(52) U.S. Cl. ......... 242/310; 242/312; 242/313; 242/314
(58) Field of Classification Search .................. 242/310, 242/312, 313, 314, 289
See application file for complete search history.

(56) References Cited

U.S. PATENT DOCUMENTS

| | | | |
|---|---|---|---|
| 5,386,948 A | 2/1995 | Sato | |
| 5,855,331 A * | 1/1999 | Morimoto et al. | 242/310 |
| 6,196,485 B1 * | 3/2001 | Sato | 242/289 |
| 6,293,483 B1 * | 9/2001 | Sato et al. | 242/289 |
| 6,364,230 B1 * | 4/2002 | Kawasaki | 242/289 |
| 6,367,726 B1 * | 4/2002 | Hyon | 242/314 |
| 6,394,381 B1 * | 5/2002 | Hirayama | 242/289 |
| 6,435,438 B1 * | 8/2002 | Hyon | 242/289 |
| 6,474,580 B1 * | 11/2002 | Hirayama | 242/289 |
| 7,051,965 B2 * | 5/2006 | Nishimura | 242/310 |
| 7,070,139 B2 * | 7/2006 | Nakagawa et al. | 242/313 |
| 7,150,423 B2 * | 12/2006 | Kawasaki | 242/310 |
| 7,530,514 B2 * | 5/2009 | Kawasaki | 242/310 |
| 2005/0056716 A1 * | 3/2005 | Kawasaki | 242/310 |
| 2005/0224617 A1 * | 10/2005 | Nakagawa et al. | 242/310 |
| 2007/0181728 A1 * | 8/2007 | Kawasaki | 242/310 |

FOREIGN PATENT DOCUMENTS

| | | |
|---|---|---|
| EP | 1 264 917 A1 | 12/2002 |
| JP | 2000-125721 | 5/2000 |
| JP | 2005-087006 | 4/2005 |

OTHER PUBLICATIONS

The extended European Search Report of corresponding European Application No. 09176554.5, dated Jun. 2, 2010.

\* cited by examiner

*Primary Examiner* — Emmanuel M Marcelo
(74) *Attorney, Agent, or Firm* — Global IP Counselors, LLP

(57) ABSTRACT

The reel unit has a first side plate made of a magnesium alloy and a first side cover made of an aluminum alloy mounted to a side of the first side plate. The first side plate has an opening and a plurality of plate-like members made of an aluminum alloy mounted to the first side plate around the opening. The first side cover has an opening, and a brake case made of an aluminum alloy turnably mounted in the opening. Aluminum alloy protrusions are formed on an outer peripheral side of the brake case. The first side cover is secured to the first side plate by causing the protrusions formed on the brake case to engage in a bayonet fashion with the plate-like members separately attached to the first side plate.

8 Claims, 11 Drawing Sheets

DUAL-BEARING REEL

CROSS-REFERENCE TO RELATED APPLICATIONS

This application claims priority under 35 U.S.C. §119 to Japanese Patent Application No. 2008-319832 filed on Dec. 16, 2008. The entire disclosure of Japanese Patent Application No. 2008-319832 is hereby incorporated herein by reference.

BACKGROUND OF THE INVENTION

1. Field of the Invention

Aspects of the present invention generally relates to a dual-bearing reel, and more specifically, the present invention relates to a dual bearing reel configured to be mounted to a fishing rod and to wind a fishing line.

2. Background Information

A dual-bearing reel generally comprises a reel unit configured to be mounted to a fishing rod, a spool rotatably mounted to the reel unit, and a handle for rotating the spool. The handle is rotatably mounted on one side of the reel unit and coupled to the spool through a gear mechanism. The reel unit comprises a frame having a left-right pair of side plates and connecting members connecting the side plates, and a left-right pair of side covers covering both sides of the frame. An opening is provided on the side plate on the opposite side of the reel unit of where the handle is mounted for the spool to pass through. The side cover that covers this side plate is detachably mounted to the side plate such that the spool can be easily removed through the opening.

Japanese Laid-Open Patent Publication No. 2000-125721 (see paragraph 0003) presents a dual-bearing reel of the kind just described in which a bayonet structure is used as a detachable mounting structure between the side cover and the side plate on the opposite side of the reel as the handle so that the side cover can be easily attached to and detached from the side plate. When a bayonet structure is used, a plurality of claw-like sections are provided on the side plate. These claw-like sections are arranged to be spaced apart in a circumferential direction around the perimeter of the opening. Protrusions are provided on the side cover and project radially so as to engage (or interlock) with the claw-like sections. Thus, by rotating the side cover, the protrusions can be made to engage with or disengage from the claw-like sections so that the side cover can be attached to or detached from the side plate.

Japanese Laid-open Patent Publication No. 2005-87006 presents a dual-bearing reel of which the weight is reduced and the aesthetic appearance is improved by making the frame (including the side plates) out of a magnesium alloy and making the side covers out of an aluminum alloy. This dual-bearing reel uses a screw structure as a detachable mounting structure between the side cover and the side plate on the opposite side of the reel as the handle. More specifically, an internally threaded portion is formed on an internal circumferential surface of the opening and an externally threaded portion configured to turnably mesh with the internally threaded portion is formed on an aluminum alloy cylindrical member that is protrudingly attached to a side portion of the side cover facing the side plate. Thus, the side cover can be detachably mounted to the side plate by turning the externally threaded portion of the cylindrical member. In order to prevent the external threads from biting into the internal threads and getting jammed, an annular member made of an aluminum alloy and having an internally threaded portion is provided as a separate entity from the aluminum alloy side cover.

In view of the above, it will be apparent to those skilled in the art from this disclosure that there exists a need for an improved dual-bearing reel. This invention addresses this need in the art as well as other needs, which will become apparent to those skilled in the art from this disclosure.

SUMMARY OF THE INVENTION

When a bayonet structure is used as a detachable mounting structure between a side cover and a side plate in a conventional dual-bearing reel having a side plate made of a magnesium alloy and a side cover cylindrical member made of an aluminum alloy, the claw-like sections of the side plate making up the bayonet structure are made of the magnesium alloy and the protrusions of the cylindrical member are made of the aluminum alloy. When the side cover is attached to or detached from the side plate, the aluminum alloy protrusions of the cylindrical member are made to engage with or disengage from the magnesium alloy claw-like sections. Consequently, when the aluminum alloy protrusions and the magnesium alloy claw-like sections are engaged and disengaged repeatedly, a painted film or anodic oxide coating on the surfaces thereof becomes worn or peeled an there is a possibility that electrolytic corrosion of the protrusions and claw-like sections will occur due to a potential difference between the aluminum alloy and the magnesium alloy. If the protrusions of the cylindrical member and the claw-like sections become electrolytically corroded, then the connection between the side cover and the side plate could become unstable.

Now consider a case in which a screw structure is used as a detachable mounting structure between a side cover and a side plate in a dual-bearing reel in which the side plate is made of a magnesium alloy and the side cover is made of an aluminum alloy. The screw structure features a separate aluminum alloy annular member having an internally threaded portion. In a screw structure having an annular member, there is the possibility that the annular member will cause the overall size of the reel to increase in comparison with a reel using a bayonet structure having claw-like sections.

Accordingly, aspects of the present invention have been created to solve the above-mentioned problems occurring in the conventional practice, and to provide a dual-bearing reel in which a side cover can be reliably secured to a side plate without causing the overall size of the reel to increase.

In accordance with one aspect of the present invention, a dual-bearing reel is attached to a fishing rod to wind a fishing line. The dual-bearing reel includes a reel unit made of a magnesium alloy, and first and second side plates wherein the second side pate faces the first side plate with a predetermined space there in-between. The dual-bearing reel also includes a spool disposed between the first and second side plates by way of an opening in the side of the first side plate so that the spool can rotate freely with respect to the first and second side plates. The fishing line is wound around an outer peripheral surface of the spool. The dual-bearing reel further includes a handle mounted to the dual-bearing reel adjacent to the second side plate and configured to rotate the spool; an engagement part made of an aluminum alloy and removably attached to an outer periphery edge of the opening of the first side plate; and a cylindrical member that includes an engaging section that extends from an outer peripheral side of the cylindrical member to engage with the engagement part to releasably secured the cylindrical member to the first side plate. The cylindrical member is made of an aluminum alloy and configured to support a rotary shaft of the spool.

In accordance with another aspect of the present invention, the engagement part is a plate-like member.

In accordance with yet another aspect of the present invention, the first side plate includes a frame member surrounding the opening and has a mounting section that protrudes outwardly to mount the plate-like member to an end face of the first side plate.

In accordance with still another aspect of the present invention, the engaging section is a protrusion, and the mounting section and the plate-like member define a gap to receive that protrusion.

In accordance with another aspect of the present invention, the plate-like member is fastened to the mounting section by a screw.

In accordance with still a further aspect of the present invention, the first side plate includes a first restricting section and a second restricting section arranged to contact substantially opposing side portions of the plate-like member, and constructed to restrict movement of the plate-like member in the lateral direction.

In accordance with yet a further aspect of the present invention, each of the first and second restricting sections extend from the mounting section, and includes a curved portion that allows an end portion of the first and second restricting sections to be positioned along an external contour of the plate-like member.

In accordance with still another aspect of the present invention, the engaging section is a plurality of engaging sections provided on the cylindrical member with a predetermined spacing there in-between, and the plate-like member is a plurality of plate-like members provided on the first side plate with a predetermined spacing there in-between.

In accordance with yet another aspect of the present invention, a cover member is mounted to the entire side of the first side plate. The cylindrical member is turnably mounted in an opening of the cover member.

In accordance with another aspect of the present invention, a spool brake device is configured to brake rotation of the spool. The spool brake includes a moving member that is proximate to a side portion of the first side plate and configured to move in a radial direction in response to rotation of the spool. The cylindrical member is arranged so that the moving member can contact an internal peripheral surface of the cylindrical member.

These and other features, aspects and advantages of the present invention will become apparent to those skilled in the art from the following detailed description, which, taken in conjunction with the annexed drawings, discloses a preferred and example embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENT

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
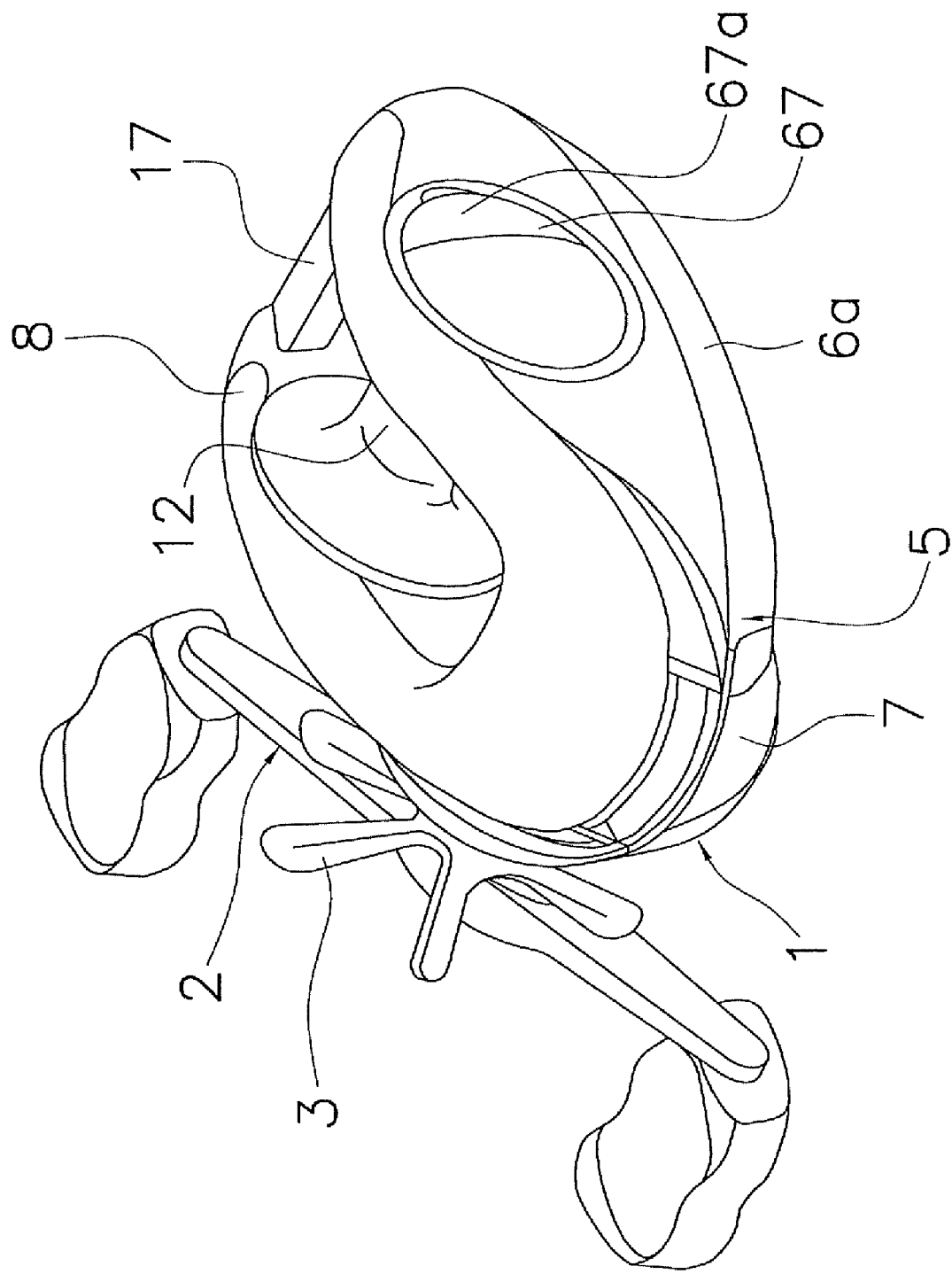
FIG. 1 is a perspective view of dual-bearing reel in which an embodiment of the present invention is employed.

Referring initially to FIG. 1, a dual-bearing reel is illustrated in accordance with one embodiment of the present invention. This reel is a low-profile reel for bait casting. This reel is equipped with a reel unit 1, a handle 2 that is arranged on a side of the reel unit 1 and configured to be used for rotating a spool, and a star drag 3 that is arranged on a side of the handle 2 that is closer to the reel unit 1 and configured to be used for adjusting the drag.

Figure 2:
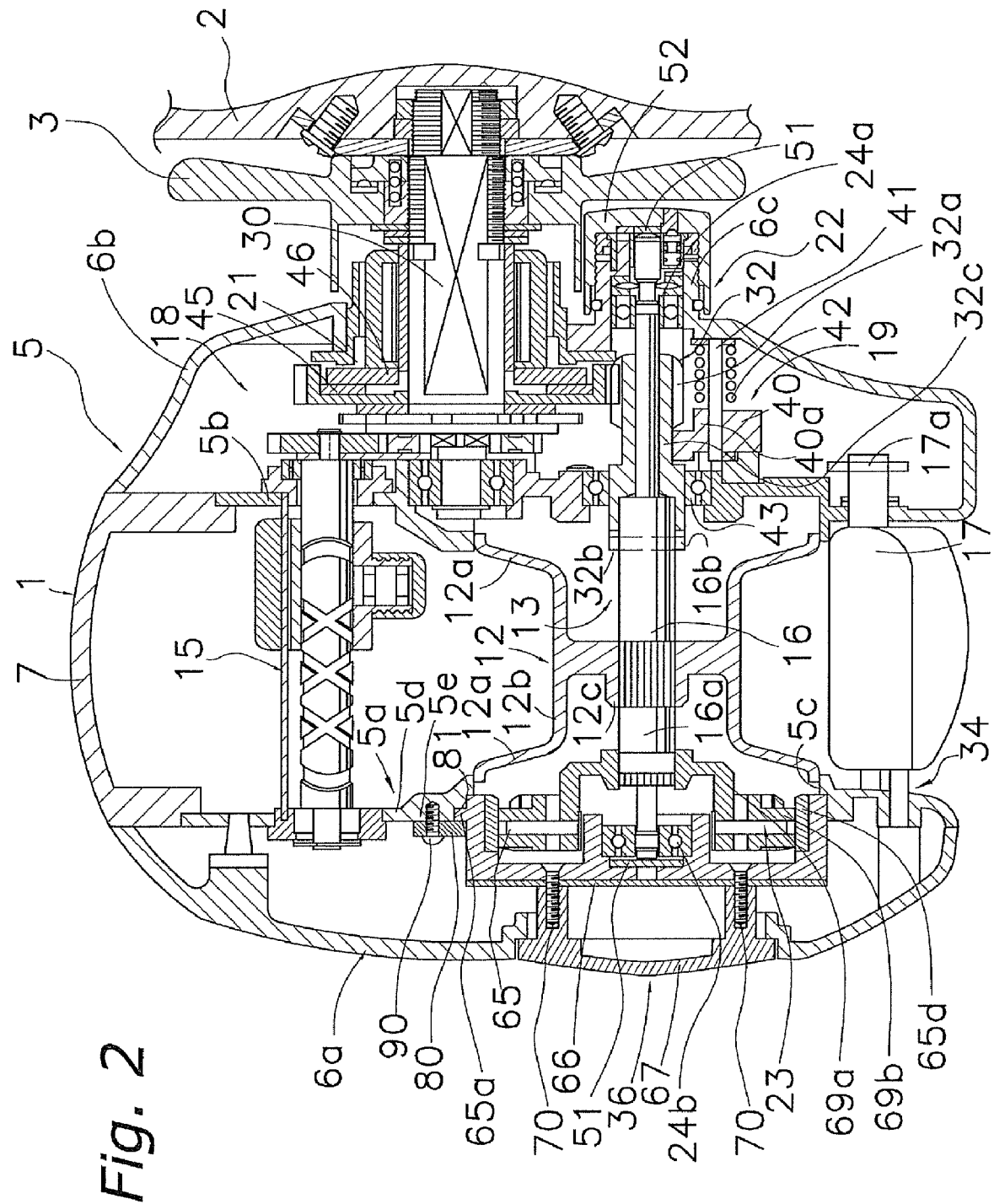
FIG. 2 is a cross sectional view of the same dual-bearing reel.

As shown in FIG. 2, the reel unit 1 includes a frame 5 made of a magnesium alloy, a first side cover 6a (exemplifying a "cover member") that is made of an aluminum alloy and attached to one side of the frame 5, and a second side cover 6b that is made of an aluminum alloy and attached to the opposite side of the frame 5. As shown in FIG. 1, the reel unit 1 also has a front cover 7 covering a front portion and a thumb rest 8 covering an upper portion of the reel unit. A spool 12 for winding a fishing line is rotatably and detachably mounted inside the reel unit 1.

The frame 5 is equipped with a first side plate 5a and a second side plate 5b arranged facing each other with a prescribed spacing there-between and a plurality of connecting parts (not shown) that connect the first side plate 5a and second side plate 5b together. The first side plate 5a, the second side plate 5b, and the connecting parts are all made of a magnesium alloy and formed as an integral one-piece, unitary member.

Figure 3:
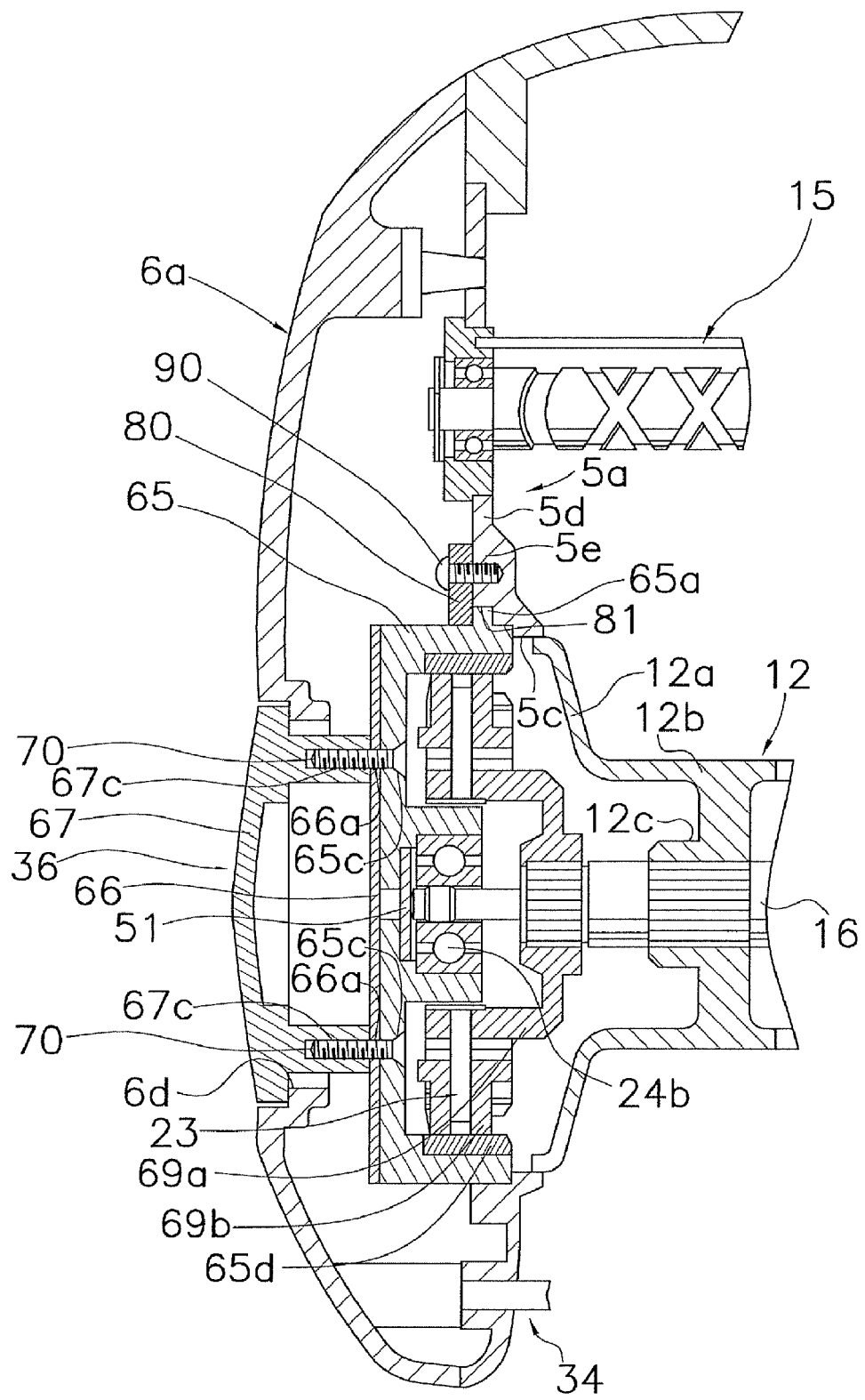
FIG. 3 is an enlarged cross sectional view of a portion of the reel including a first side plate.
Figure 4:
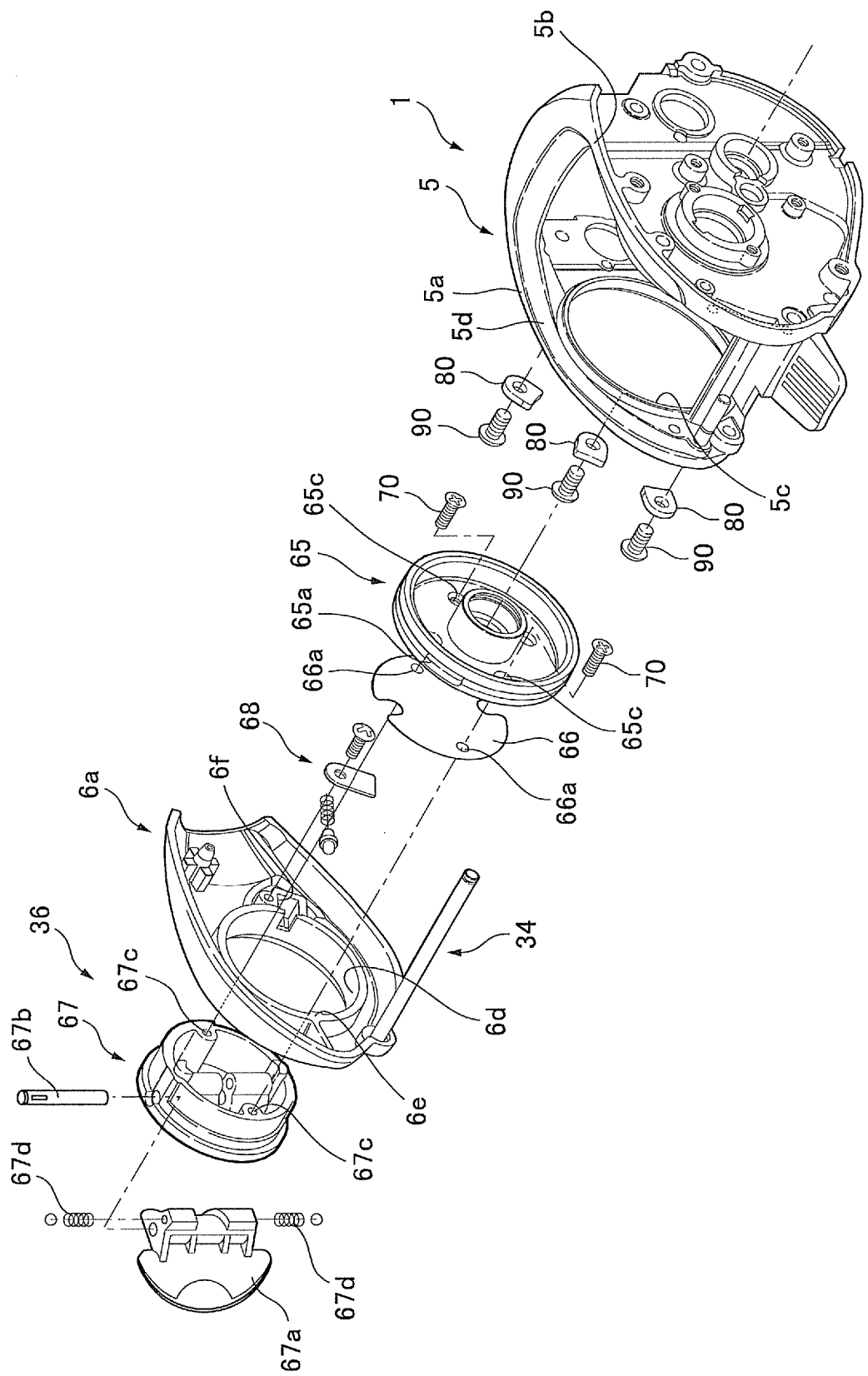
FIG. 4 is an exploded perspective view showing a first side cover, a knob member, a brake case, and a frame.
Figure 6:
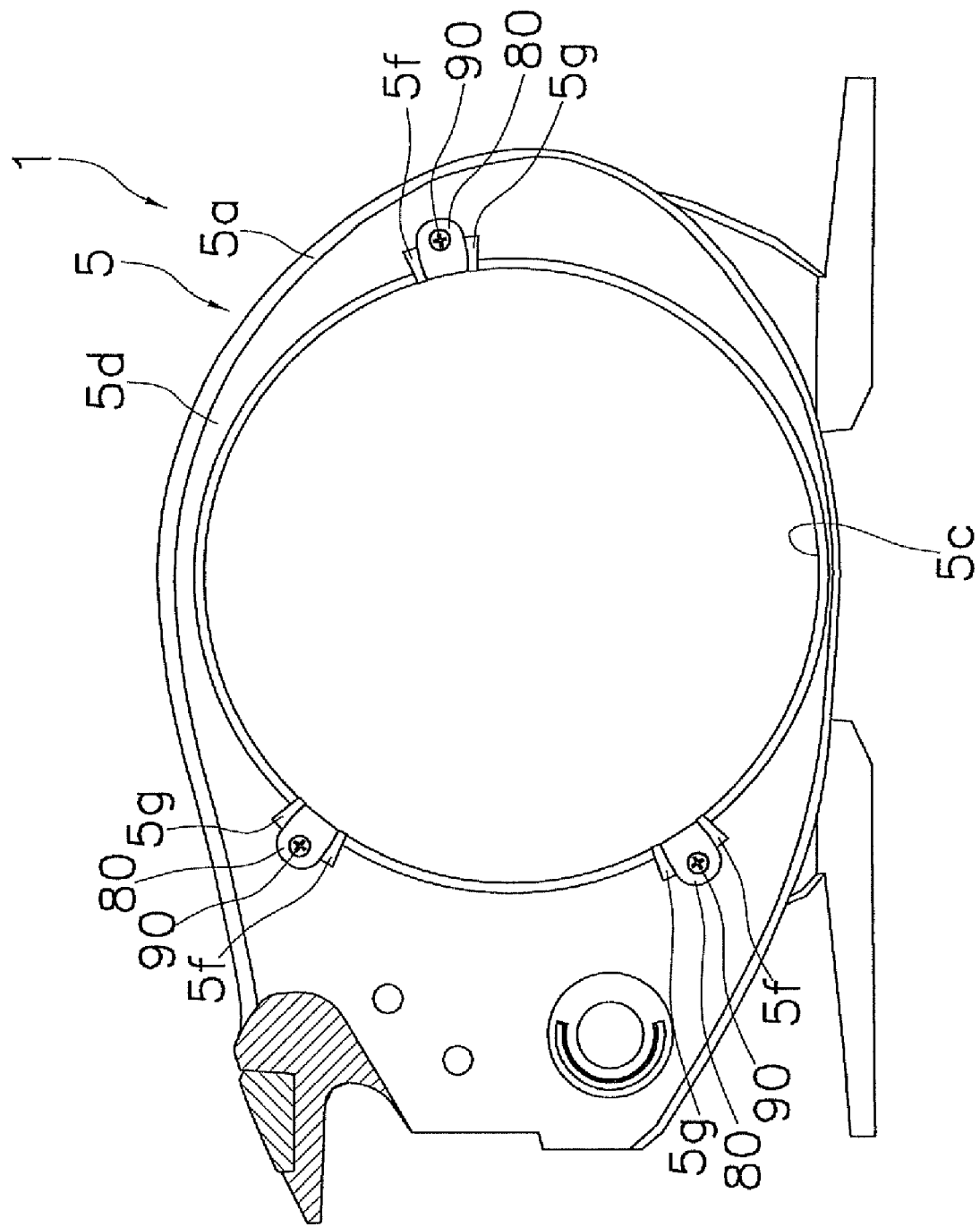
FIG. 6 is an enlarged side view of a portion of the reel including the first side plate when the first side cover, the knob member, and the brake case have been removed.

As shown in FIGS. 3, 4, and 6, the first side plate 5a has an opening 5c and a frame member 5d that is made of magnesium alloy. The opening 5c is provided in a side portion of the first side plate 5a such that the spool 12 can be passed therethrough. The surface of the magnesium alloy frame member 5d has been treated with anodic oxidizing or electroplating.

Figure 9:
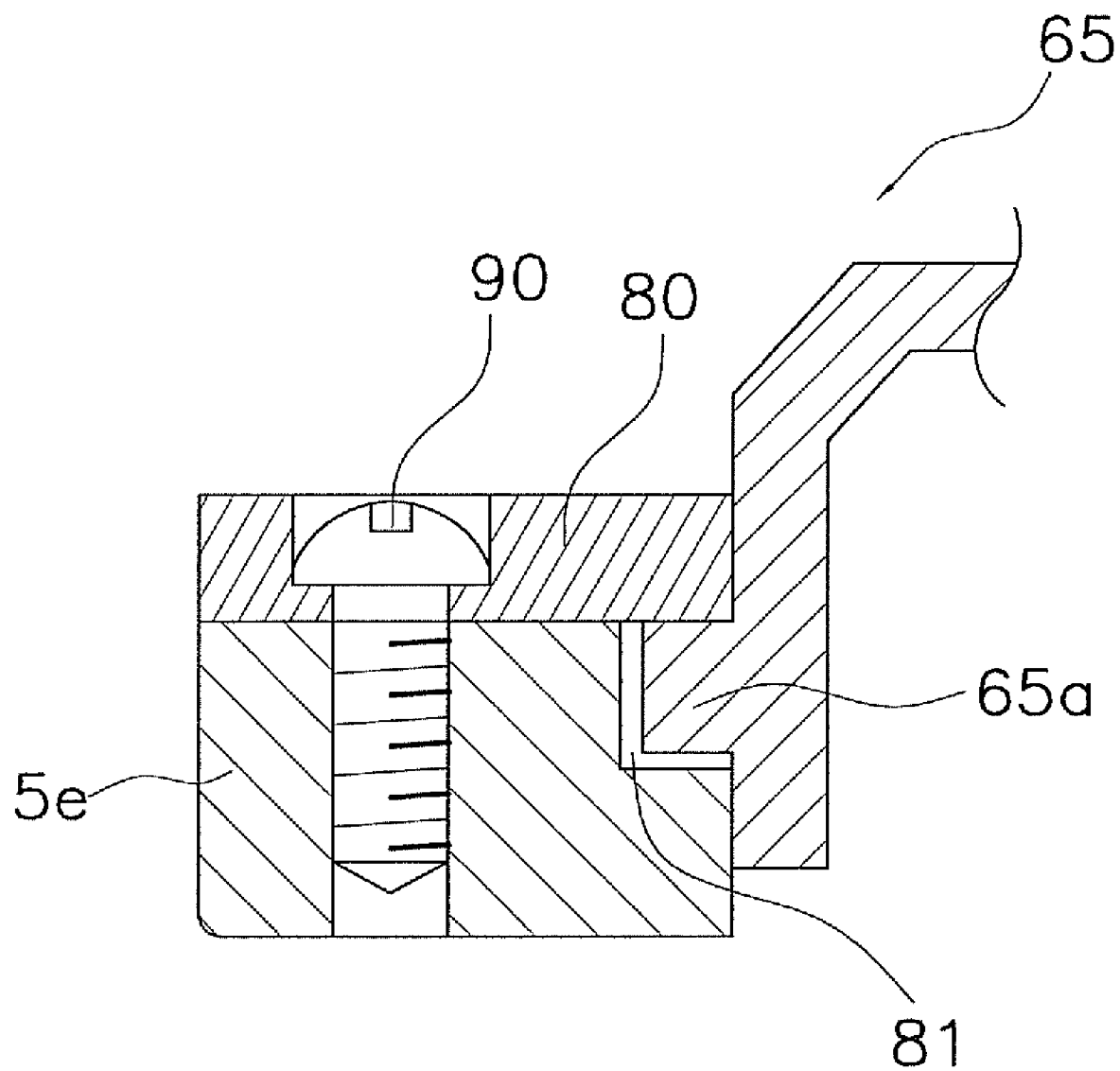
FIG. 9 is an enlarged cross sectional view showing the same plate-like member and surrounding parts when the brake case has been mounted to the first side plate.
Figure 10:
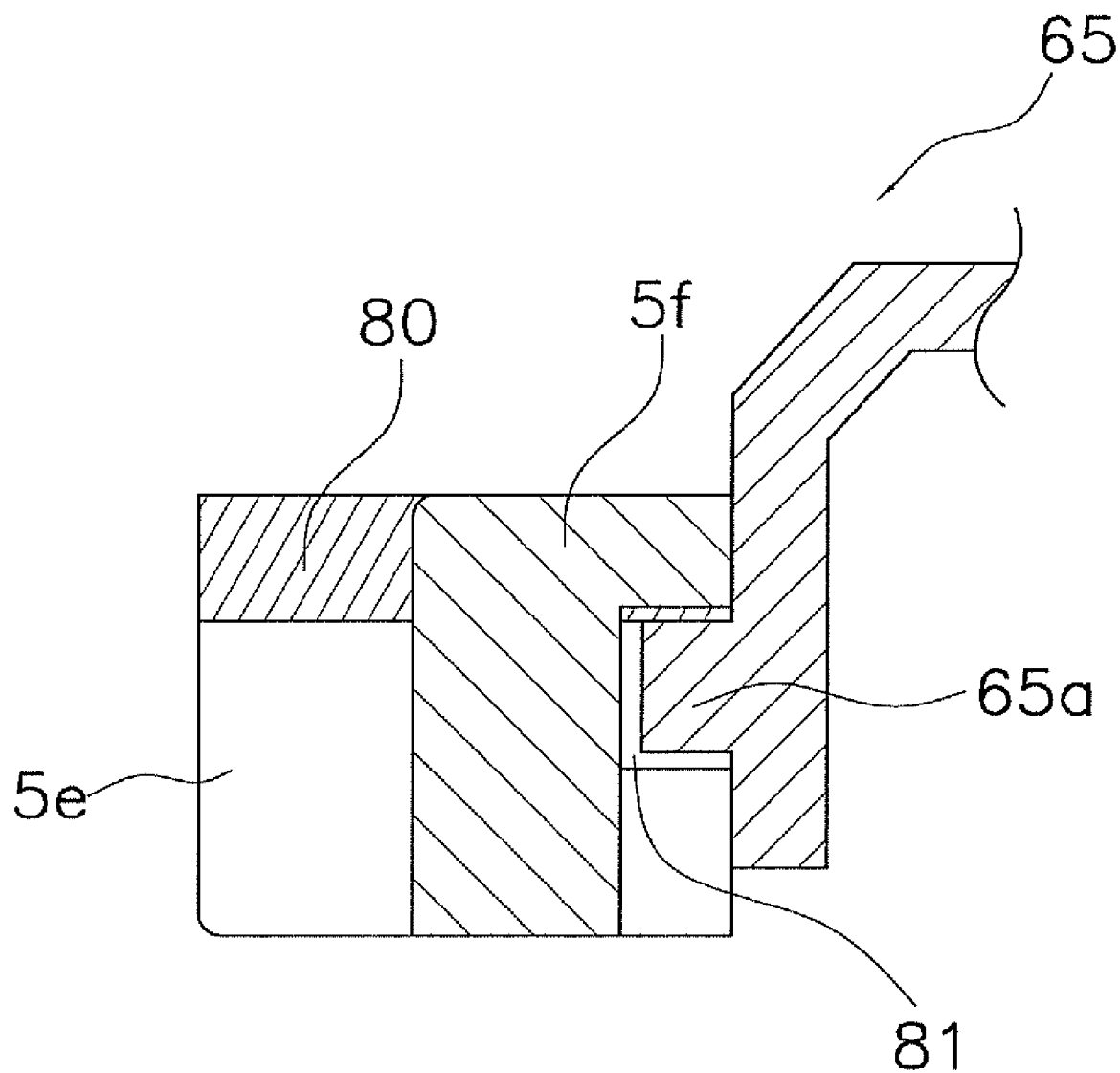
FIG. 10 is an enlarged cross sectional view showing the a first restricting section and surrounding parts when the brake case has been mounted to the first side plate.
Figure 11:
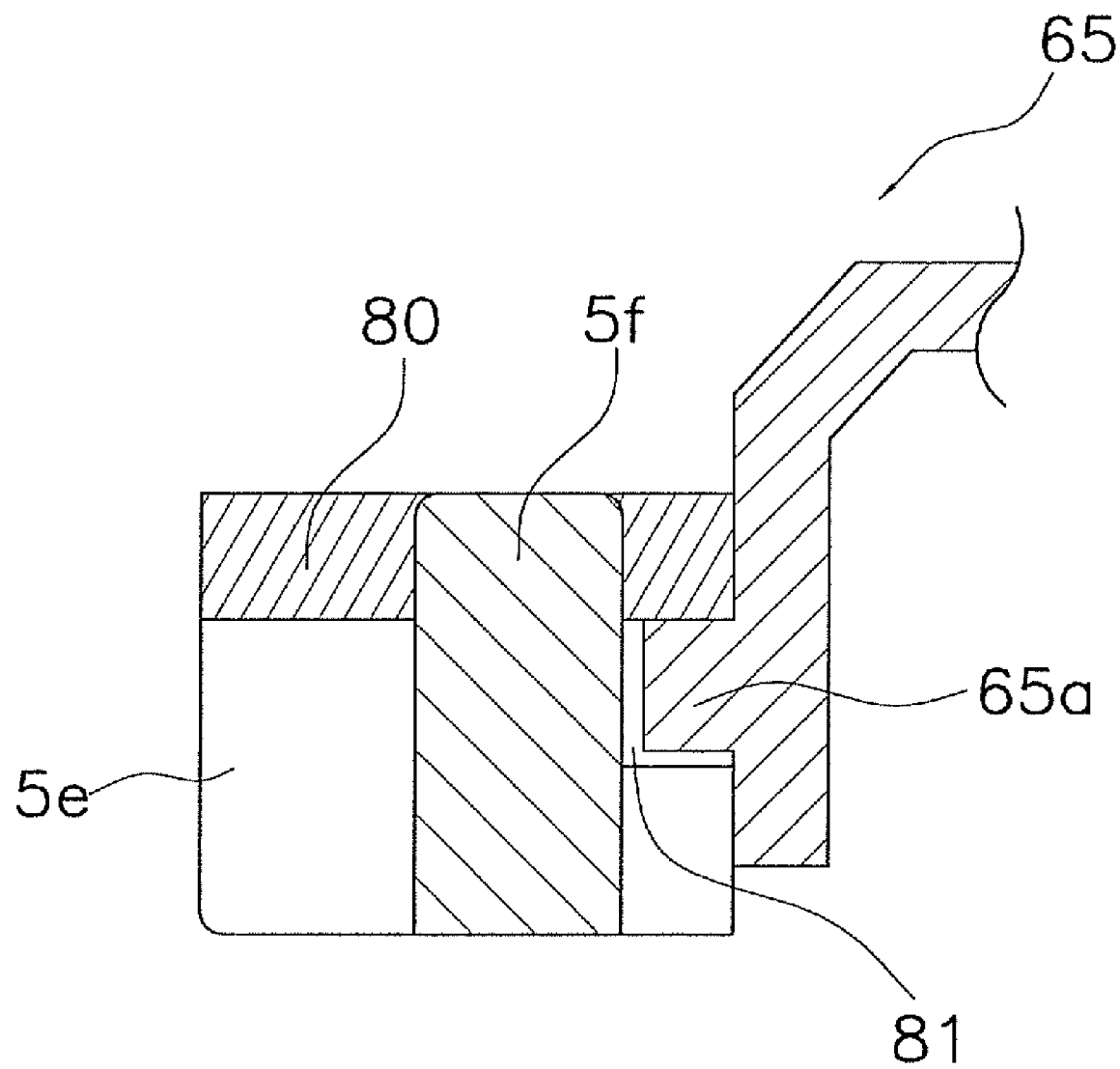
FIG. 11 is an enlarged cross sectional view of another embodiment and is substantially similar to FIG. 10.

As shown in FIGS. 3, 9, and 10, the first side plate 5a is constructed such that a portion of the frame member 5d surrounding the opening 5c protrudes outward and forms a mounting section 5e for mounting an aluminum alloy plate-like member 80 (example of an "engagement part") on an end face thereof with a bolt member 90. The mounting section 5e is a column like section that protrudes outward beyond the remainder of the frame member 5d and has a planar end face.

The mounting section 5e is formed as an integral portion of the frame member 5d, which is made of a magnesium alloy. As shown in FIG. 6, the first side plate is provided with three mounting sections 5e arranged with a prescribed spacing in-between. The plate-like member 80 is fastened to the end face of each of the mounting sections 5e with a bolt member 90 that is threaded at one end. A protrusion 65a (example of an "engaging section") of a brake case 65 (example of a "cylindrical member," explained later) is arranged and configured to engage in a bayonet fashion with a gap 81 formed between the mounting sections 5e and the plate-like members 80.

Figure 7:
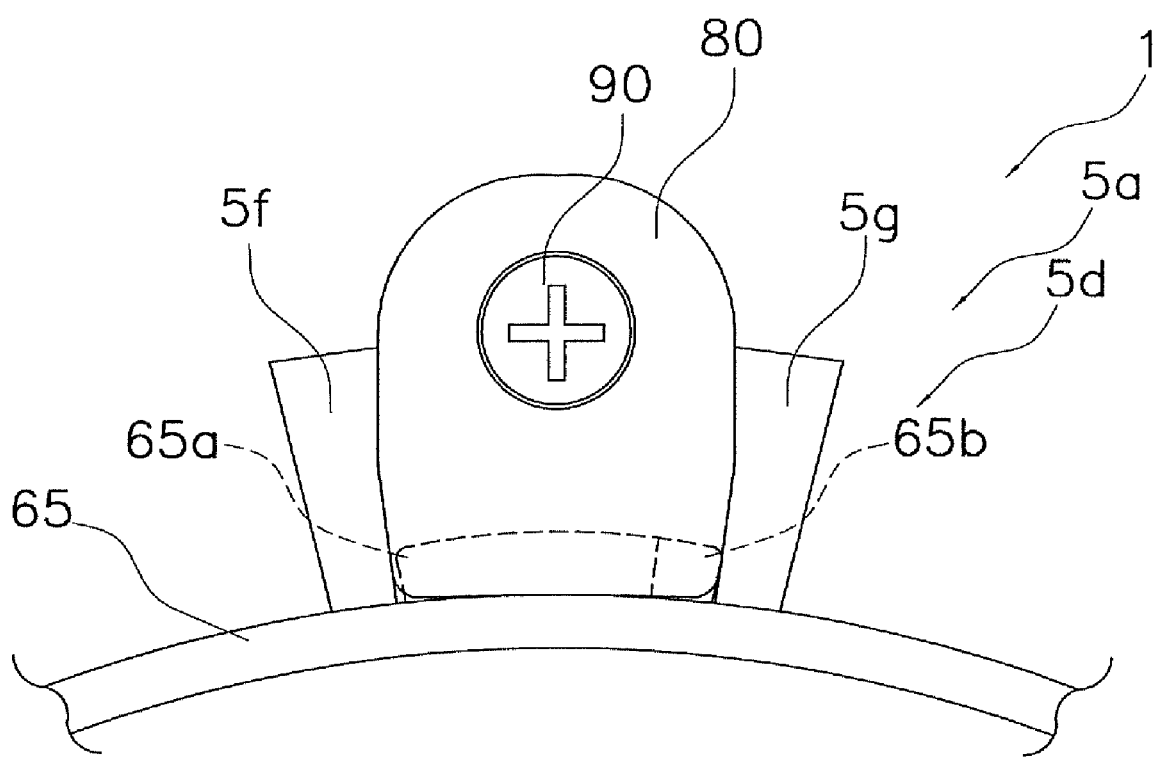
FIG. 7 is an enlarged side view of a plate-like member and surrounding parts when the brake case has been mounted to the first side plate.
Figure 8:
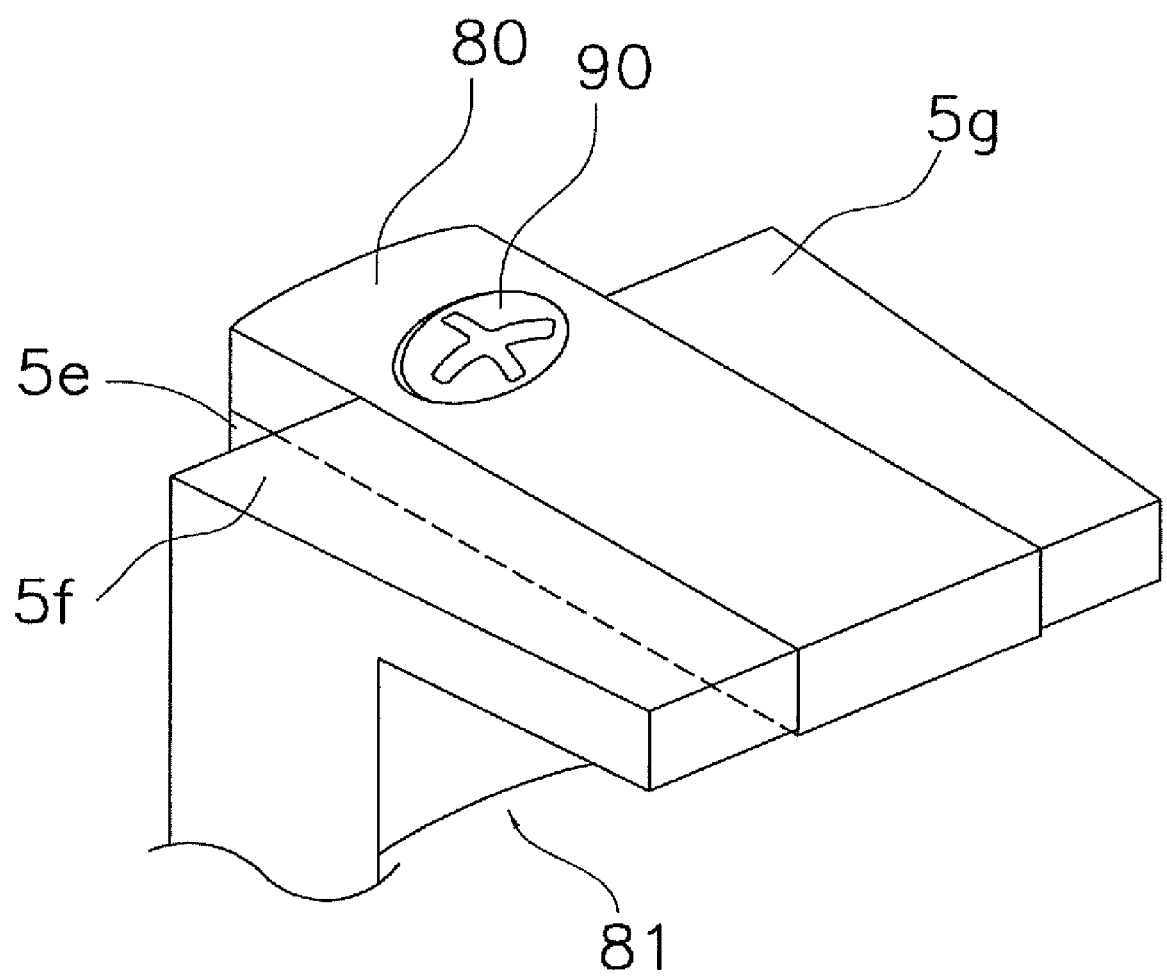
FIG. 8 is an enlarged perspective view of a plate-like member and surrounding parts.

As shown in the enlarged views of FIGS. 7 and 8, each of the plate-like members 80 is a rectangular plate-like member that is made of an aluminum alloy and has rounded corners. The plate-like member 80 is configured to have slightly slanted sides such that a lateral width thereof tapers from a base end side where the bolt member 90 is installed toward a tip end where the protrusion 65a of the brake case 65 engages in a bayonet fashion. The rounded corners of the base end of the plate-like member 80 are larger than the rounded corners of the tip end. As shown in FIGS. 9 and 10, the plate-like member 80 is configured to have a substantially uniform thickness. In this embodiment, there are three plate-like members 80 attached in three different locations with three bolt members 90. Each of the plate-like members 80 has the same shape and is fastened to one of the three mounting sections 5e with one of the bolt members 90.

As shown in FIGS. 6, 7, 8, 10, the first side plate 5a has a first restricting section 5f and a second restricting section 5g arranged at each of the mounting sections 5e and configured to protrude such that they can contact two substantially opposite side portions of the plate-like member 80 mounted to the mounting section 5e and restrict movement of the plate-like member 80 in two substantially opposite lateral directions. The first restricting sections 5f and the second restricting sections 5g are formed integrally with the magnesium alloy first side plate 5a. The first restricting sections 5f and the second restricting sections 5g are arranged in positions where they do not contact the aluminum alloy protrusions 65a. As shown in FIG. 8 and FIG. 10, each of the first restricting sections 5f and the second restricting sections 5g is bent from the mounting section 5e in an inverted L-like shape so as to follow an external contour of the plate-like member 80. As shown in FIGS. 8 and 10, each of the first restricting sections 5f and the second restricting sections 5g is configured such that a thickness thereof is slightly smaller than a thickness of a plate-like member 80. The first restricting section 5f and the second restricting section 5g are each arranged such that a surface thereof is in the same plane as a surface of the plate-like member 80. As a result, the protrusions 65a engage in a bayonet fashion only with the plate-like members 80 and the protrusions 65a do not contact the first restricting sections 5f or the second restricting sections 5g. As shown in FIGS. 7 and 8, outside shapes of the first restricting section 5f and the second restricting section 5g of each mounting section 5e are symmetrical with respect to a lengthwise center axis of the plate-like member 80. Also, as shown in FIGS. 7 and 8, the first restricting section 5f and the second restricting section 5g have a trapezoidal outside shape that is slightly slanted on an inward side so as to follow the contour of two substantially opposite sides of the plate-like member 80. As a result, the two substantially opposite sides of each of the plate-like members 80 are reliably guided by the first restricting section 5f and the second restricting section 5g such that the plate-like member 80 can be prevented from moving in either of the lateral directions.

As shown in FIGS. 1 through 4, the first side cover 6a is pivotably mounted to the frame 5 to enable the spool 12 to be installed and removed. As shown in FIGS. 3 and 4, the first side cover 6a is mounted to the first side plate 5a such that it covers an entire side portion of the first side plate 5a. An opening 6d is provided in a side portion of the first side cover 6a and configured for the bottomed cylindrical brake case 65 (example of a "cylindrical member") to be turnably mounted therein. As shown in FIGS. 2 and 4, the first side cover 6a has a pivot mechanism 34 and an open/close mechanism 36. The pivot mechanism 34 supports the first side cover 6a at a rear portion of the frame 5 such that the first side cover 6a can pivot and can move in a direction of separating from the frame 5. The open/close mechanism 36 is a mechanism for turning the brake case 65 from the outside in order to open and close the first side cover 6a.

As shown in FIGS. 3 and 4, the open/close mechanism 36 includes the brake case 65 (which is generally shaped like a bottomed cylinder), a plate-like disk member 66, a knob member 67 configured to be mounted in the opening 6d formed in the first side cover 6a, and a positioning mechanism 68 that is mounted to the knob member 67 such that it can extend and retract along a radial direction. The knob member 67 is mounted in the opening 6d such that it can both rotate and move in an axial direction and has a knob piece 67a that is attached to the knob member 67 such that it can pivot about an axis oriented along a radial direction.

Figure 5:
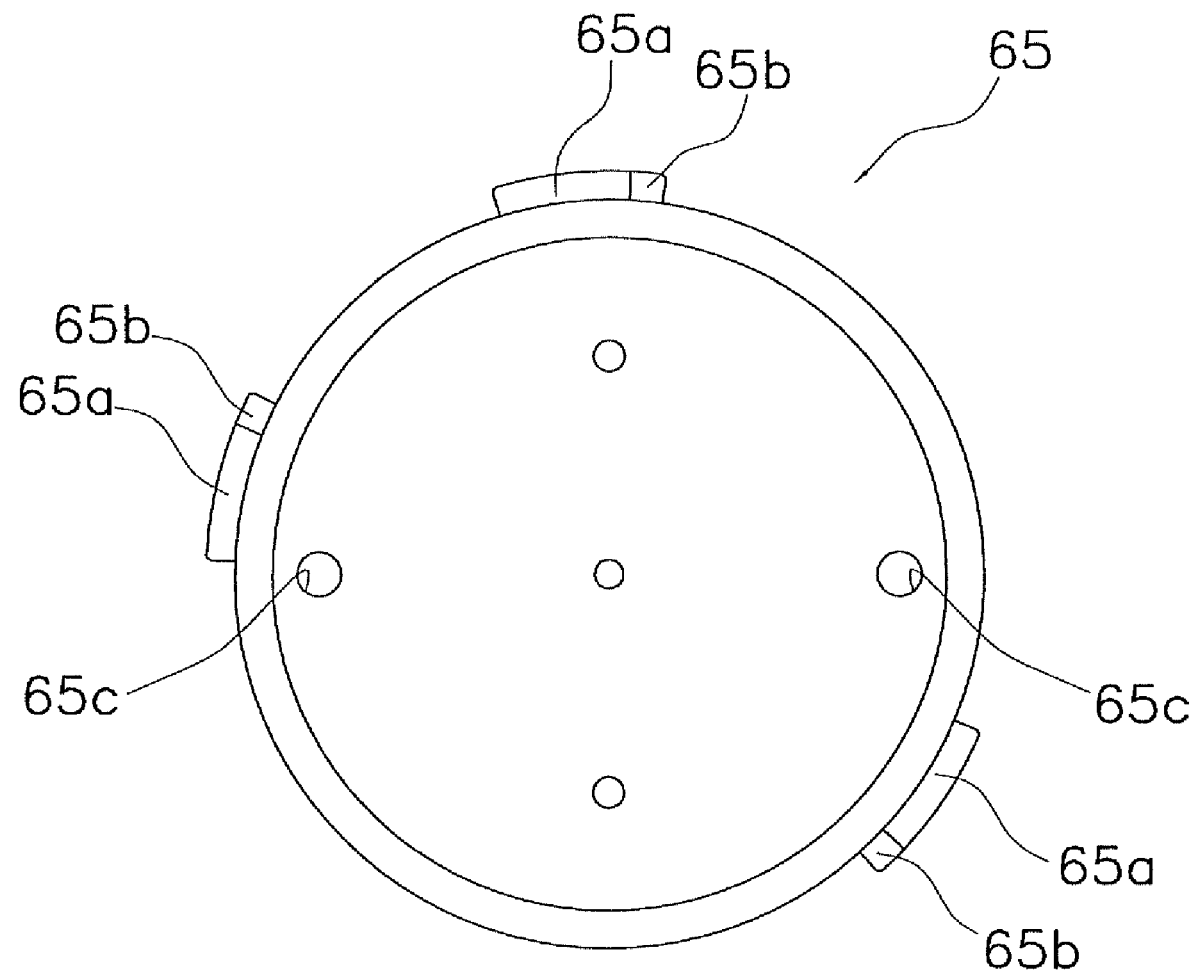
FIG. 5 is an enlarged plan view of the brake case.

As shown in FIGS. 1 to 4, the brake case 65 is a cylindrical member that serves to support a spool shaft 16 and is mounted such that it covers the opening 5c of the first side plate 5a. The brake case 65 is made of an aluminum alloy and has three protrusions 65a formed on an outer periphery thereof with spaces in-between. As shown in FIGS. 5 and 7, the protrusions 65a provided on an outer circumferential portion of the brake case 65 are configured to engage with the plate-like members 80 of the first side plate 5a such that the brake disk 65 can be detachably mounted to the first side plate 5a. As shown in FIG. 5, the protrusions 65a are arranged on the brake case 65 in three locations with a prescribed spacing in-between, i.e., the same spacing as the plate-like members 80 of the first side plate 5a. As shown in FIG. 7, the protrusions 65a engage in a bayonet fashion with the gaps 81 formed by the plate-like members 80 and the mounting sections 5e of the first side plate 5a. As shown in FIGS. 5 and 7, each of the protrusions 65a has a slanted section 65b provided on an edge portion the protrusion 65 that faces in a turning direction (direction in which the protrusions 65a move in order to engage). The slanted sections 65a are configured to slant toward the turning direction and serve to make the protrusions 65a enter into the gaps 81 of the plate-like members 80 more readily. By turning the brake case 65, the aluminum alloy protrusions 65a formed on the brake case 65 are made to engage in a bayonet fashion with the aluminum alloy plate-like members 80 attached to the magnesium alloy first side plate 5a. In this way, the brake case 65 is secured to the first side plate 5a.

As shown in FIGS. 3 and 4, the knob member 67 is generally cylindrical and configured to be mounted in the opening 6d of the first side cover 6a such that it can turn but cannot move in an axial direction. The brake case 65 and the disk member 66 are fastened to the knob member 67 with bolt members 70. As shown in FIG. 4, the first side cover 6a is sandwiched between the knob member 67 and disk member 66 and the brake case 65 by inserting the knob member 67 through the opening 6d of the first side cover 6a, inserting the two bolt members 70 through two through holes 65c formed in the brake case 65 and two through holes 66a formed in the disk member 66, and screwing the bolt members 70 into two threaded holes 67 formed in the knob member 67. In this way, the knob member 67 is mounted to the first side cover 6a such that it can turn but cannot move in an axial direction.

As shown in FIG. 4, the first side cover 6a has a turn restricting section 6e comprising a protruding portion on an internal circumference of the opening 6d. The turn restriction section 6e is arranged and configured to contact a step-like portion formed on an outside circumference of the knob member 67 and restrict a turning range of the knob member 67. As shown in FIG. 4, a positioning mechanism mounting section 6f is provided contiguous to the opening 6d of the first side cover 6a for mounting the positioning mechanism 68. The knob member 67 serves to lock and unlock the knob member 67. As shown in FIG. 4, the positioning mechanism mounting section 6f comprises a pin member and a spring member. A recess corresponding to a locked state of the knob member 67 and a recess corresponding to an unlocked state of the knob member 67 are provided on an outer circumference of the knob member 67. When the knob member 67 is turned to either a position corresponding to the locked state or a position corresponding to the unlocked state, the pin member of the positioning mechanism mounting section 6f is held in the corresponding recess by the spring force of the spring such that the knob member 67 is positioned in either the locked state or the unlocked state. When the knob member 67 is changed to either the locked state or the unlocked state, a sound is generated by the contact of the pin member against the corresponding recess in the outer circumference of the knob member 67.

As shown in FIG. 4, the knob piece 67a is generally semi-circular in shape and pivotably attached to an outer side portion of the knob member 67. A pivot shaft 67b attached to the knob member 67 is arranged passing through the knob piece 67a, and a spring member 67d is secured at one end to the knob piece 67a and at another end to the knob member 67 so as to exert a spring force against the knob piece 67a in a direction of closing the knob piece 67a with respect to the knob member 67. In this way, the knob piece 67a can be opened and closed with respect to the knob member 67. When the first side cover 6a is being attached or detached from the first side plate 5a, the knob piece 67a is opened against the spring force of the spring 67d and grasped in order to turn the knob member 67. The brake case 65 turns together with the knob member 67 and the protrusions 65a on an outer circumference of the brake case 65 become engaged or disengaged with respect to the plate-like members 80 of the first side plate 5a, thereby enabling the first side cover 6a to be attached to or detached from the first side plate 5a.

As shown in FIG. 2, the spool 12, a level wind mechanism 15, and a clutch lever 17 are arranged inside the frame 5. The spool 12 is arranged in a direction perpendicular to a fishing rod, the level wind mechanism 15 serves to wind a fishing line uniformly across the spool 12, and the clutch lever 17 serves as a thumb contact when thumbing is performed. The following are arranged between the frame 5 and the second side cover 6b: a gear mechanism 18 for transferring torque from the handle 2 to the spool 12 and the level wind mechanism 15; a clutch mechanism 13; a clutch engaging/disengaging mechanism 19 for engaging/disengaging and controlling the clutch mechanism 13 in accordance with an operation of the clutch lever 17; a drag mechanism 21; and a casting control mechanism 22 for adjusting a resistance force that acts when the spool 12 rotates. An centrifugal braking mechanism 23 for suppressing backlash during casting is arranged between the frame 5 and the first side cover 6a.

As shown in the enlarged view of FIG. 5, the spool 12 has a line winding body section 12b arranged with an internal circumference thereof mounted on the spool shaft 16 and configured for a fishing line to be wound onto an external circumference thereof, and flange sections 12a arranged on substantially opposite ends of the line winding body section 12b and configured to protrude radially outward. The line winding body section 12b is made of an aluminum alloy and has a boss section 12c arranged with an internal circumference thereof mounted on the spool shaft 16 and a cylindrical section 12d that is formed integrally with the boss section 12c and cylindrically configured for a fishing line to be wound onto an external circumference thereof.

As shown in FIG. 2, the spool shaft 16 passes through the second side plate 5b and extends to a position outside the second side cover 6b. The extended end of the spool shaft 16 is rotatably supported with a bearing 24a in a boss section 6c formed on the second side cover 6b. Another end of the spool shaft 16 is rotatably supported on a bearing 24b inside the centrifugal brake mechanism 23. The bearings 24a and 24b are sealed ball bearings.

A right end of a large diameter section 16a of the spool shaft 16 is arranged in a through-passage portion of the second side plate 5b and an engaging pin 16b forming part of the clutch mechanism 13 is fastened thereto. The engaging pin 16b passes through the large diameter section 16a along a diameter thereof and both ends of the engaging pin 16b protrude from the large diameter section 16a along a diametrical direction.

The gear mechanism 18 includes the handle shaft 30, a main gear 31 that is fixed to the handle shaft 30, and a cylindrical pinion gear 32 that meshes with the main gear 31. A vertical position of the handle shaft 30 of the gear mechanism is lower than in a conventional reel in order to lower a height of the thumb rest 8. Consequently, bottom portions of the second side plate 5b and the second side cover 6b in which the gear mechanism 18 is housed are positioned lower than bottom portions of the first side plate 5a and the first side cover 6a.

As shown in FIG. 2, the pinion gear 32 is a cylindrical member that extends inward from outside the second side plate 2b and is arranged such that the spool shaft 16 passes through a center thereof. The pinion gear 32 is mounted on the spool shaft 16 in such a manner that it can move freely there-along in an axial direction. The end of the pinion gear 32 depicted as the left end in FIG. 2 is supported rotatably and axially moveably on the second side plate 5b by means of a bearing 43. The bearing 43 is a sealed ball bearing.

The pinion gear 32 has a toothed section 32a that is formed on an external circumference of the end of the pinion gear 32 depicted as the right end in FIG. 2 and configured to mesh with the main gear 31, a meshing section 32b formed on the other end of the pinion gear 32, and a narrow neck section 32c formed between the toothed section 32a and the meshing section 32b. The meshing section 32b is a recessed groove that is formed along a diameter in the end face of the pinion gear 32 and configured to engage with the engaging pin 16b, which is securely arranged passing through the spool shaft 16. If the pinion gear 32 moves outward such that the meshing part 32b becomes disengaged from the engaging pin 16b of the spool shaft 16, then torque will not be transferred from the handle shaft 30 to the spool 12. The meshing section 32a and the engaging pin 16b constitute the clutch mechanism 13. When the engaging pin 16b and the meshing section 32b are engaged with each other, torque is transmitted directly from the pinion gear 32 (which has a larger diameter than the spool shaft 16) to the spool shaft 16. Consequently, torsional deformation is smaller and the torque transmission efficiency is improved.

The clutch lever 17 is arranged is in a rearward position located between the first side plate 5a and the second side plate 5b and behind the spool 12, as shown in FIG. 2.

As shown in FIG. 2, the clutch engaging/disengaging mechanism 19 has a clutch yoke 40. The clutch yoke 40 is arranged around an outside circumference of the spool shaft 16 and supported on two pins 41 (only one shown in the figure) such that it can move along a direction parallel to a center axis of the spool shaft 16. The clutch yoke 40 has an engaging section 40a that is arranged in a middle portion of the clutch yoke 40 and configured to engage with the narrow neck section 32c of the pinion gear 32. A spring 42 is arranged around an outer circumference of each of the pins 41 on which the clutch yoke 40 is supported. The springs 42 are positioned between the clutch yoke 40 and the second side cover 6b and serve to constantly spring load the clutch yoke 40 inward.

With this configuration, under normal circumstances, the pinion gear 32 is in a clutch engagement position where the meshing section 32b is engaged with the engaging pin 16b of the spool shaft 16, thereby achieving a clutch-on state. Meanwhile, when the pinion gear 32 is moved outward by the clutch yoke 40, the engaging section 32b and the engaging pin 16b become disengaged and a clutch-off state is achieved.

The drag mechanism 21 has a friction plate 45 arranged and configured to press against the main gear 31 and a pushing plate 46 arranged and configured to push the friction plate 45 against the main gear 31 with a prescribed force in response to a rotational operation of the star drag 3.

The casting control mechanism 22 is furnished with a plurality of friction plates 51 arranged so as to sandwich both ends of the spool shaft 16 and a brake cap 52 for regulating the force with which the friction plates 51 pinch the spool shaft 16. A left friction plate 51 is mounted inside the brake case 65.

As shown in FIG. 3, the centrifugal brake mechanism 23 comprises the brake case 65, a rotary member 69a provided inside the brake case 65, and a plurality of movable members 69b arranged on the rotary member 69a with circumferential spaces in-between and mounted such that they can be moved in a radial direction. A cylindrical brake liner 65d is fixed on an internal circumferential surface of the brake case 65 such that it can contact the moveable members 69b. The brake case 65 is detachably mounted in the circular opening 5c formed in the first side plate 5a such that it can pivot together with the first side cover 6a. The brake case 65 serves both as a member enabling the first side cover 6a to be attached to the first side plate 5a and as a component part of the centrifugal brake mechanism 23.

In a dual-bearing reel constructed as described heretofore, the first side cover 6a is fixed to the first side plate 5a by engaging the aluminum alloy protrusions 65a formed on the brake case 65 (which is turnably mounted in the first side cover 6a) with the aluminum alloy plate-like members 80 (which are attached as separate entities to the magnesium alloy first side plate 5a). Since both the protrusions 65a and the plate-like members 80 are made of an aluminum alloy, electrolytic corrosion can be prevented from occurring in the manner of a conventional reel having an engaging section made of an aluminum alloy engaged with an engagement part made of a magnesium alloy. In other words, since the protrusions 65a and the plate-like members 80 are both made of an aluminum alloy and will not corrode even if they contact each other, the brake case 65 will remain securely fastened to the first side plate 5a and will not become unstable. Additionally, since the aluminum alloy plate-like members 80 can be provided only in a localized positions (three in this embodiment), the overall size and weight of the reel can be reduced in comparison with a conventional screw structure having a separate annular member. As a result, the first side cover 6a can be reliably secured to the side plate without causing the overall size of the reel to increase.

EFFECTS OF THE INVENTION

With a dual-bearing reel according to the present invention, the cylindrical member—which is, for example, turnably mounted in a side cover—is secured to the magnesium alloy first side plate by an engagement of an aluminum alloy engaging section formed on the cylindrical member with a aluminum alloy engagement part attached as a separate entity to the first side plate. As a result, the side cover can be reliably secured to the side plate without causing the overall size of the reel to increase.

Other Embodiments (a) Although in the previously explained embodiment the reel is a low profile reel for bait casting, the invention can also be applied to another type of dual-bearing reel.

(b) Although in the previously described embodiment the first restricting sections 5f and the second restricting sections 5g are formed integrally with the magnesium alloy frame member 5d of the first side plate 5a, it is also acceptable to provide the first restricting sections 5f and second restricting sections 5g as separate members made of an aluminum alloy.

(c) Although in the previously explained embodiment the first restricting sections 5f and the second restricting sections 5g are configured to extend in an inverted L-shape from the mounting sections 5e so as to follow an external contour of the plate-like members 80, it is also acceptable for the restricting sections 5f and 5g to be simple rectangular plate-like members that contact only a portion of two substantially opposite sides of each of the plate-like members 80.

(d) Although in the previously explained embodiment the brake case 65 functions as a case for holding the brake liner 65d, which serves as a member for the moveable members 69b of the centrifugal brake mechanism 23 to contact, the brake case 65 can also function as a case for mounting magnets and other mechanisms of a magnetic brake mechanism in a reel (not shown in the figures) that uses a magnetic brake mechanism instead of a centrifugal brake mechanism 23.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applied to words having similar meanings such as the terms, "including," "having," "with" and their derivatives. Also, the term "part," "section," "portion," "member," or "element" when used in the singular can have the dual meaning of a single part or a plurality of parts.

As used herein, the following directional terms "forward", "rearward", "above", "below", "downward", "upward", "vertical", "horizontal", "inner", "outer", "longitudinal" and "transverse" as well as any other similar directional tennis refer to those directions of a device equipped with the present invention. Accordingly, these terms, as utilized to describe aspects of the present invention, should be interpreted relative to a device equipped with the present invention.

The term "configured" as used herein to describe a component, section or part of a device implies the existence of other unclaimed or unmentioned components, sections or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A dual-bearing reel attached to a fishing rod to wind a fishing line, comprising:
   a reel unit made of a magnesium alloy, and including a first side plate and a second side plate facing the first side plate with a predetermined space there in-between;
   a spool disposed between the first and second side plates by way of an opening in a side portion of the first side plate so that the spool rotates freely with respect to the first and second side plates, the fishing line being wound around an outer peripheral surface of the spool;
   a handle mounted to the dual-bearing reel adjacent to the second side plate and configured to rotate the spool;
   an engagement part made of an aluminum alloy and removably attached to an outer periphery edge of the opening of the first side plate; and
   a cylindrical member including an engaging section that extends from an outer peripheral side of the cylindrical member to engage with the engagement part to releasably secured the cylindrical member to the first side plate, the cylindrical member being made of an aluminum alloy and configured to support a rotary shaft of the spool,
   the engagement part having a plate shape,
   the first side plate having a mounting section that protrudes outwardly to mount the engagement part to an end face of the first side plate,
   the engaging section being a protrusion,
   the mounting section and the engagement part defining a gap to receive the protrusion, the gap being configured between the mounting section and the engagement part.

2. The dual-bearing reel according to claim 1, wherein the engagement part is fastened to the mounting section by a screw.

3. The dual-bearing reel according to claim 1, wherein the first side plate further including a first restricting section and a second restricting section arranged to contact substantially opposing side portions of the engagement part and constructed to restrict movement of the engagement part in the direction of the first and second restricting sections.

4. The dual-bearing reel according to claim 3, wherein each of the first and second restricting section extending from the mounting section, and including a curved portion that allows an end portion of the first and second restricting sections to be positioned along an external contour of the engagement part.

5. The dual-bearing reel according to claim 4, wherein the engaging section is a plurality of engaging sections provided on the cylindrical member with a predetermined spacing there in-between, and the engagement part is a plurality of engagement parts provided on the first side plate with a predetermined spacing there in-between.

6. The dual-bearing reel according to claim 5, further comprising
   a cover member mounted to and covering the entire side of the first side plate, the cylindrical member being turnably mounted in an opening of the cover member.

7. The dual-bearing reel according to claim 6, further comprising
   a spool brake device configured to brake rotation of the spool, the spool brake including a moving member proximate to a side portion of the first side plate and configured to move in a radial direction in response to rotation of the spool, and the cylindrical member arranged so that the moving member can contact an internal peripheral surface of the cylindrical member.

8. The dual-bearing reel according to claim 1, further comprising
   a bolt being configured to fix the engagement part to the mounting part, wherein
   the bolt extends parallel to the rotary shaft, and
   the protrusion extends the towards the bolt.

* * * * *